Oct. 19, 1965  M. R. DUVAL  3,213,246
PROTECTIVE ENCAPSULATION FOR ELECTRICAL DEVICES
Filed April 9, 1962  3 Sheets-Sheet 1

Inventor,
Montague Richard Duval,
by Harold Levine
Att'y.

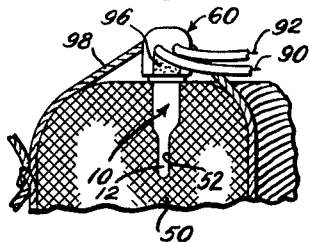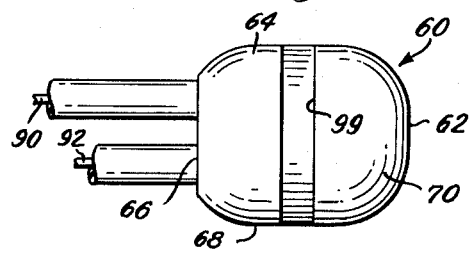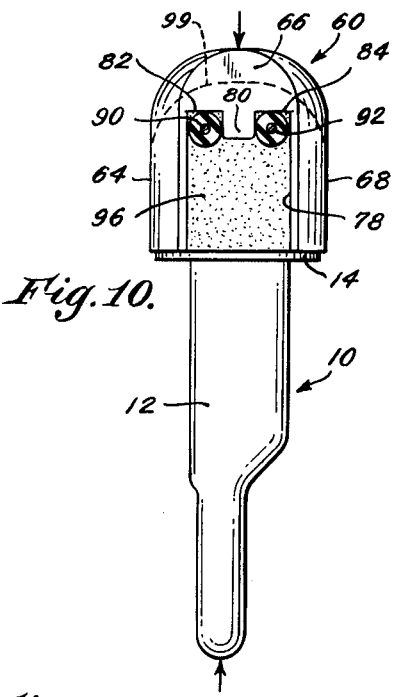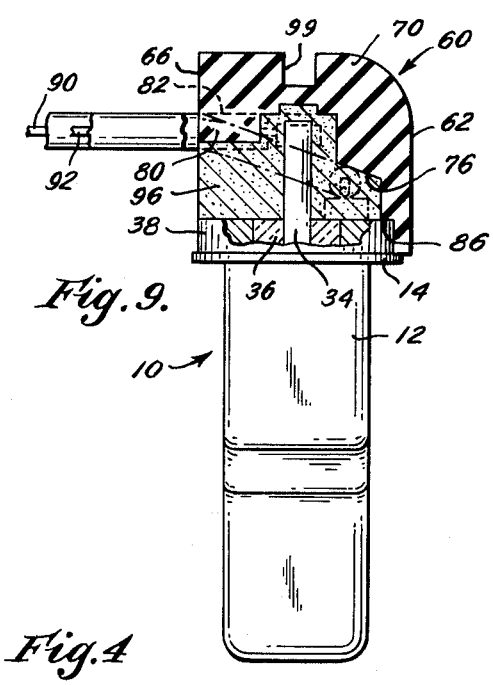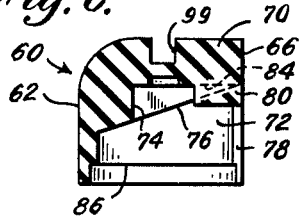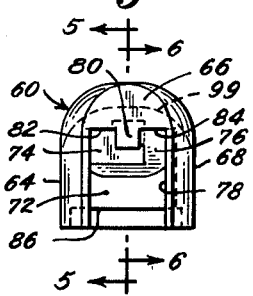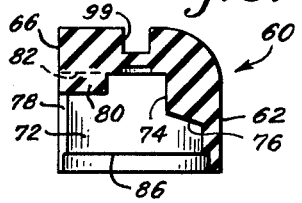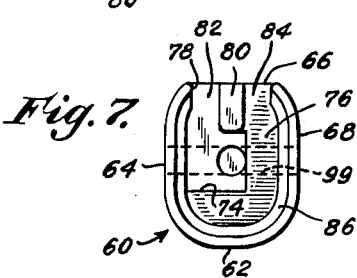

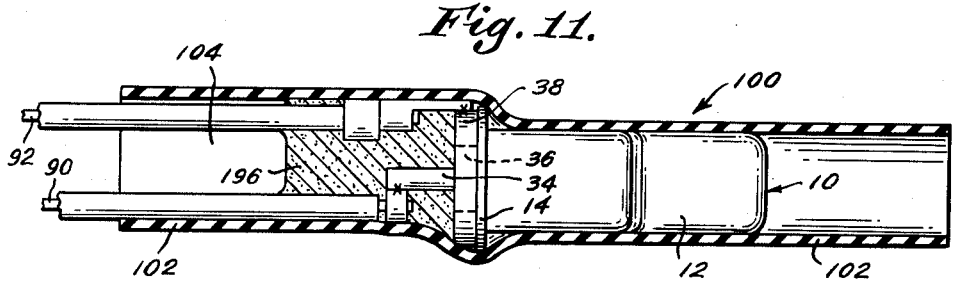
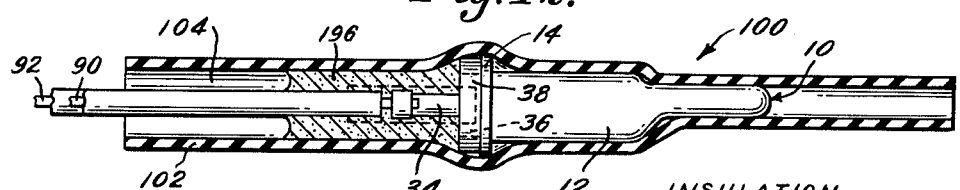
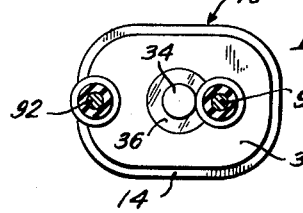
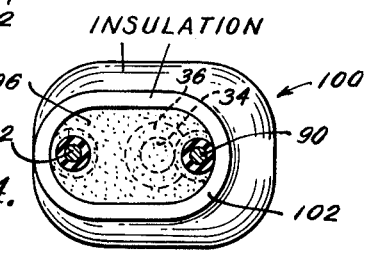
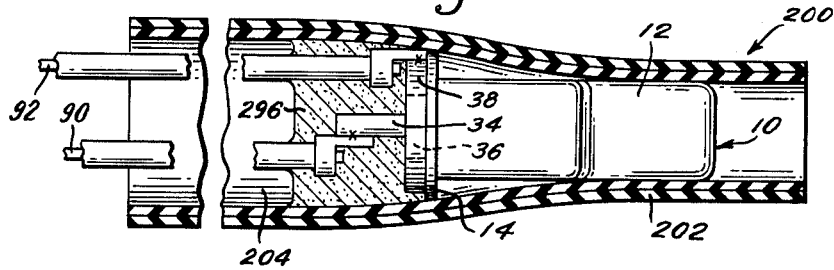
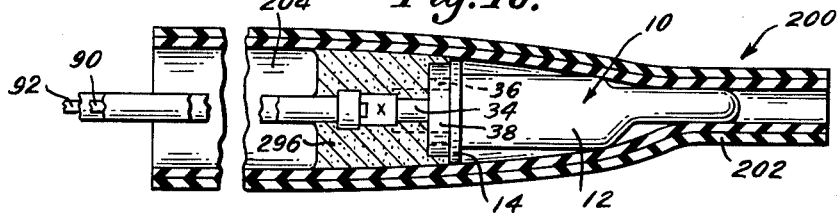

United States Patent Office 3,213,246
Patented Oct. 19, 1965

3,213,246
PROTECTIVE ENCAPSULATION FOR ELECTRICAL DEVICES
Montague Richard Duval, Rehoboth, Mass., assignor to Texas Instruments Incorporated, Dallas, Tex., a corporation of Delaware
Filed Apr. 9, 1962, Ser. No. 186,213
13 Claims. (Cl. 200—113)

The present invention relates to electrical devices and more particularly to protection of exposed, relatively fragile or delicate components of electrical devices, such as, for example, miniaturized electrical switches.

In the past breakage problems have been experienced with the relatively fragile and delicate terminals, their connections to electrical leads, glass to metal hermetic type seals and with other associated exteriorly exposed parts of electrical devices (such as, for example, miniaturized thermally responsive electrical switches) during handling and mounting of these devices. Breakage of the glass to metal seal not only results in destruction of the hermetically sealed integrity of the switch but in many cases also results in deleterious calibration shifts of the device which may destroy the utility of the device.

Accordingly, among the several objects of the present invention may be noted the provision of means which will obviate or at least minimize the problems described above; the provision of such means which will not effect any substantial increase in over-all dimension of the device; and the provision of such means which embodies a minimum number of parts, and which is simple and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of the various possible embodiments of the invention are illustrated:

FIG. 3 is a fragmentary sectional view of a portion of a motor winding showing a thermostatic switch provided with protection means according to one embodiment of the invention received in an opening or cavity in said winding and secured thereto by tie means;

FIG. 4 is a front elevational view of a cap member forming a part of a protection means according to a first embodiment of the invention;

Figure 1:
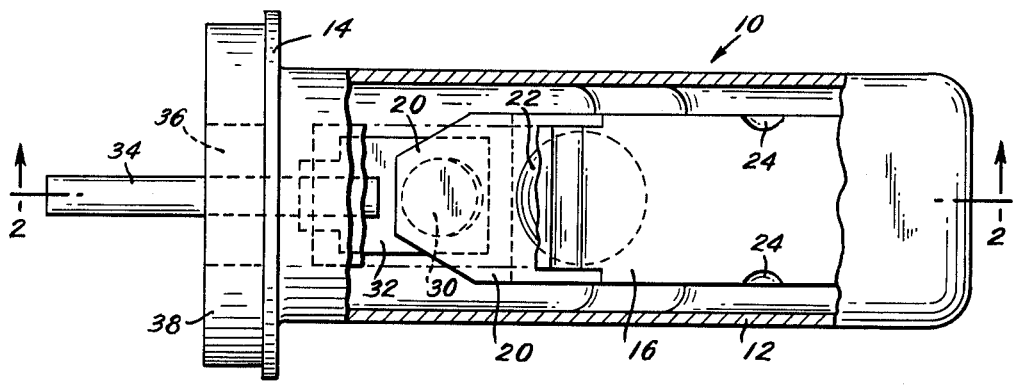
FIG. 1 is a top plan view with parts broken away of an exemplary miniaturized electrical device in the form of a thermally responsive electrical switch to which the present invention is applicable.
Figure 2:
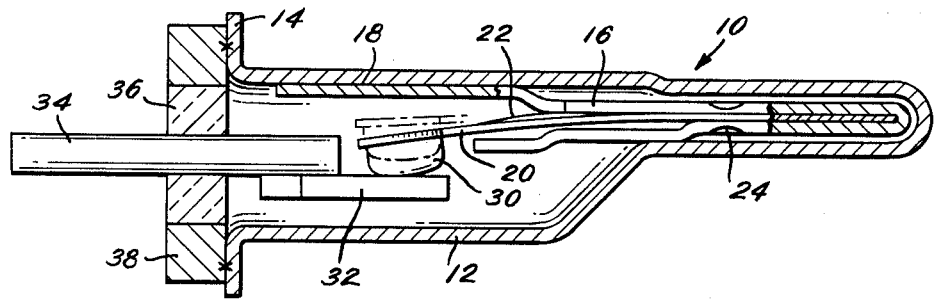
FIG. 2 is a sectional view of the switch illustrated in FIG. 1, taken on line 2—2 of FIG. 1.

FIGS. 5 and 6 are sectional views respectively taken on line 5—5 and line 6—6 of FIG. 4;

FIG. 7 is a bottom view of the cap member shown in FIG. 4;

FIG. 8 is a top plan view of the cap member shown in FIG. 4 in its assembled position with an electrical device such as shown in FIGS. 1 and 2;

FIG. 9 is a side elevational view of the completed switch assembly shown in FIG. 8 showing the cap and other portions in section;

FIG. 10 is a left-hand elevation of the assembly shown in FIG. 9;

FIG. 11 is a plan view with certain of the parts shown in section of an assembly according to a second embodiment of the invention;

FIG. 12 is an elevational view of the assembly shown in FIG. 11 with certain of the parts shown in section;

FIG. 13 is a left-hand elevational view of the assembly shown in FIG. 12 showing only the electrical switching device;

FIG. 14 is a left-hand elevational view of the assembly shown in FIG. 12;

FIG. 15 is a plan view with parts in section of an assembly according to a third embodiment of the present invention; and FIG. 16 is an elevational view, with parts in section, of the assembly shown in FIG. 15.

Similar reference characters indicate corresponding parts throughout the several views of the drawings.

Dimensions of certain of the parts as shown in the drawings may have been modified and/or exaggerated for the purposes of clarity of illustration.

Briefly, according to the present invention, a mold member is disposed about the electrical terminal (or terminals), the glass to metal hermetic seal and other exteriorly exposed delicate parts of the electrical device which are to be protected. The mold member confines a potting material, for example, an electrically insulating thermosetting resin material, which is infilled into the mold cavity provided by the member, and which material when it hardens serve to protect the exposed delicate parts to provide a rugged assembly and other advantages which will be set forth in greater detail below.

In the FIGS. 3–10 embodiment the mold member takes the form of a cap which interfits with the header or one end of the casing of the electrical device. The cap, when in assembled position, provides a cavity in which the terminal and electrical leads are received and which cavity is infilled, through an opening in a side wall of the cap member, with a thermosetting resin material to permanently secure and protect the parts. The cap member is also provided with a groove in which is received a tie means to facilitate securement of the switch to an article whose temperature is to be sensed.

In the FIGS. 11–13 and 15–16 embodiments the mold member takes the form of a tubular sleeve which surrounds the electrical device and projects beyond at least one end thereof to provide a pocket in which is disposed the exposed parts of the device which are to be protected. The sleeve is formed of a heat shrinkable material which, after being heat shrunk, conforms to the exterior configuration of the electrical device. The cavity or pocket provided by the sleeve confines the thermosetting resin material which is infilled therein to protect the exposed parts of the device from damage during handling and to provide a rugged assembly.

Referring now to FIGS. 1 and 2 there is shown an exemplary electrical device generally designated by numeral 10 to which the present invention is applicable. Device 10 may take the form of a hermetically sealed thermally responsive electrical switch such as that shown and described in a co-pending application of Walter H. Moksu and Henry David Epstein, Serial No. 812,528, filed May 11, 1959, which issued on September 17, 1963, as Patent No. 3,104,296 and assigned to the assignee of the instant application. Reference may be had to this patent for details of construction of the exemplary switch shown in FIGS. 1 and 2. Generally thermally responsive switch 10 comprises a can or tubular casing member 12 closed at one end and open at the other end, as shown, the open end being provided with a peripherally extending flange 14. Casing 12 is preferably metallic and formed of a good electrically conductive and thermally conductive material.

Disposed within casing 12 is an upper electrical terminal 16 which is electrically connected at one end to the casing 12 as at 18. Switch 10 also includes a snap-acting thermally responsive strip type element 20 which is provided with a deformed portion 22 which is responsible for its snap action. Element 20 is clamped and sandwiched between portions of the upper terminal 16 as best seen in FIG. 2. Element 20 is also welded to the upper terminal as at 24 to firmly cantilever mount the element 20 and to provide a good electrical connection between element 20 and the upper terminal 16 all as described in the aforementioned co-pending application. The free end of element 20 is provided with an electrical contact 30 positioned for engagement with a stationary electrical contact 32 mounted on or carried by an electrically conductive terminal pin member 34. Terminal 34 is mounted in a glass sealant portion 36 of a metallic electrically conductive header member 38 which is peripherally secured to flange 14 as by welding to hermetically seal switch 10. As best seen in FIG. 2, terminal member 34 also extends exteriorly of casing 12 in a direction generally axially with respect thereto.

It will be understood that when the snap-acting thermally responsive element 20 is heated to a predetermined amount (by the current flowing therethrough and/or by the ambient heat), element 20 will snap from the solid to the dashed line position shown in FIG. 2 to separate contacts 30 and 32.

Switch 10 is an example of a switch which has been made in miniaturized form as small as 13/16" long (exclusive of the externally projecting terminal 34), 1/4" wide and 1/4" thick. In such miniaturized constructions the terminal pin 34 is of a relatively small gauge and is generally delicate and fragile and not capable of withstanding severe handling and in many cases may be subject to deformation which may result in cracking or breaking of the glass sealant 36 which will destroy the hermetically sealed integrity of the switch and can also result in deleterious calibration shifts in the operation of the device 10. The thermostatic switch illustrated in FIGS. 1 and 2 is particularly well suited for protective use with motors and because of its miniaturized construction it can conveniently be inserted into the small spaces directly adjacent the heated parts of the motor (e.g., the windings) which are to be protected.

In FIG. 3 is shown, an example of one method of attachment of the thermostat 10 to a motor winding 50. Winding 50 may be provided with a thermostat receiving cavity or opening 52 in which a substantial portion of the casing 12 of the switch 10 is inserted so as to be in intimate heat transfer relation to the motor winding or article whose temperature is to be sensed. To insert the switch 10 into the opening or cavity 52 it is necessary to exert a force against the top or upper part (the header portion) of the switch to force the device 10 into the opening 52. It is in such applications that the problems of terminal breakage, glass (hermetic seal) breakage and damage to other externally exposed associated parts of switch 10 particularly manifest themselves.

Referring now to FIGS. 4–10, there is shown an arrangement for protecting the exposed fragile and delicate parts of device 10 according to a first embodiment. This embodiment includes a mold member in the form of a cap member generally designated by numeral 60 which interfits with the header 38 or the open-ended part of casing 12 of device 10. Cap member 60 may be formed of an electrically insulating material such as one of the phenolic moldable resins. Cap member 60 includes a skirt portion which is defined by the four walls 62, 64, 66 and 68. Cap 60 is open at one end as best seen in FIGS. 4 and 7, and is closed at the other end by a top wall 70. Top wall 70 and skirt providing walls 62, 64, 66 and 68 are preferably formed integrally as by molding from one of the conventional electrically insulating phenolic thermosetting resin materials. Cap member 60 provides an interior cavity 72 which includes a communicating cavity portion 74 adapted to receive and house therewithin the projecting terminal pin member 34 and an electrically conductive lead 90 connected thereto as by welding when the parts are assembled together as best seen in FIG. 9. An interior portion 76 of the upper wall of cavity 72 is tapered and slopes upwardly in a direction toward wall 66 as best seen in FIGS. 6 and 9. As best seen in FIGS. 4, 7 and 10, wall 66 is provided with an exteriorly communicating opening 78, which communicates with cavity 72. Wall 66 also includes a member 80 which projects into opening 78 to provide two notched electrical lead receiving portions 82 and 84 as best seen in FIGS. 4 and 10. Cap 60 further includes an interior peripherally extending shoulder 86 which is adapted to mate and interfit with the open end portion of casing 12 and with the header 38, which seals the open end of casing 12. As best seen in FIGS. 9 and 10, cap 60 is configured to closely mate and tightly interfit with the header 38 to confine the potting or epoxy material which is introduced into and infills cavity 72 as will be described in greater detail below.

Switch 10 is provided with a pair of electrically conductive leads 90 and 92, each of which may be provided with an electrically insulating outer layer, as shown in FIGS. 3, 9 and 10. Lead 90 is electrically connected to terminal 34 as by welding and lead 92 is electrically connected to the electrically conductive header 38 which serves as the other terminal for thermostatic switch 10 shown in FIGS. 1 and 2. Cap 60 when it is mounted in place on switch 10 with the header 38 received in the peripherally extending interior groove or shoulder 86 receives and houses within its cavity, the terminal member 34 and also a portion of leads 90 and 92. When thus assembled, lead 92 abuts against the inclined or sloping surface 76 which serves to orient and position this lead. Also, when so assembled, each of leads 90 and 92 are respectively received within notched portions 82 and 84 (see FIG. 10) which serves to align and properly orient the leads for suitable connection into a circuit with which the switch or electrical device 10 is to be employed.

After the parts have been aligned and assembled, as just described, the assembly is turned on its side so that exteriorly communicating opening 78 faces upwardly and pressure is applied to the top wall 70 of the cap member 60 and to the opposite end of the casing 12 as suggested by the arrows in FIG. 10. While the assembly is under pressure, the interior cavity 72 (and cavity 74) is infilled, through the exteriorly communicating opening 78, with a relatively heat conductive, electrically insulating thermosetting resin material 96, a suitable example being an epoxy potting compound which can be introduced (or injected) into cavity 72 under pressure by a conventional epoxy dispenser. After the thermosetting resin material hardens, it permanently bonds to the cap member 60, the terminal 34, the header 38, etc., to provide a protective encasement or encapsulation for the delicate or fragile exteriorly exposed parts of the electrical device 10 and provides a rugged compact assembly. The hardened thermosetting resin material 96 (indicated in FIG. 10 by the stippled portions) solidly and rigidly maintains the parts in electrically insulated permanently assembled relation with the lead members properly oriented with respect to the electrical device 10.

The completed cap-switch assembly described above can be quickly and easily mounted, for example, on a motor winding, as shown in FIG. 3. Conveniently the switch receiving opening or cavity 52 can be provided during fabrication of the winding and the device 10 can thereafter be inserted. The cap member 60, which is infilled with material 96 and bonded to device 10, advantageously provides a convenient area against which a force may be exerted to push or insert the switch 10 into the motor winding opening 52 without incurring any damage to the parts of the switch and because of the absence of jagged or protruding surfaces of the assembly also obviates or at least minimizes damage to the motor winding during insertion and mounting of the switch 10.

Switch 10 can be secured to the winding, in final assembled relation, by means of a cord 98, as shown in FIG. 3, or by other suitable tie means. To facilitate tieing and securing the switch unit shown in FIG. 9 in place on a motor winding, an exteriorly exposed surface of wall 70 of cap member 60 is provided with an elongated tie means receiving groove or slot 99 extending transversely across cap member 60 as best seen in FIGS. 9 and 10.

One advantage of the cap construction is that it is minimal in size and does not provide any substantial increase in the over-all dimensions of the electrical device or switch unit 10.

The multiple function cap member 60 which acts as a mold, advantageously confines the potting material 96 therewithin and prevents the potting compound 96 from seeping down past flange 14 over the other portions of the switch so that the thermal conductivity of the metallic casing 12 portion of the switch 10 is not impaired and the formation of jagged potting portions on the body of the casing 12 is avoided which, if permitted to form, could break off and damage the equipment or system with which device 10 is used. An example of an application where contaminating potting particles can be particularly deleterious is in a refrigerator compressor which requires exacting cleanliness for proper operation.

Referring now to FIGS. 11-14, there is shown an assembly generally designated by numeral 100 according to a second embodiment of the present invention. Assembly 100 comprises an electrical device generally designated by numeral 10 which is or may be substantially identical to the exemplary device 10 shown in FIGS. 1 and 2. In this regard those parts of the FIGS. 11-14 embodiment having the same numerals as their respective counterparts in FIGS. 1-2 and 3-10 are or may be substantially identical with these respective counterparts, except as pointed out hereinafter. Assembly 100 includes a preformed open-ended tubular sleeve 102 which is formed of a heat shrinkable thermoplastic resin material. Suitable examples of such materials are Teflon (a trademark for a tetrafluoroethylene polymer material manufactured by the E. I. duPont de Nemours Co.), a polyvinyl material, a polyvinyl chloride material, and a polyolefin material. The polyolefin material is particularly useful in refrigeration applications where the assembly is exposed to freon. Electrical switching device 10, with its leads 90 and 92 electrically connected thereto as by welding (as indicated by an X in FIG. 11), is slidably inserted into the tubular sleeve 102 so that a portion of the sleeve extends beyond one end of the casing to provide a pocket or cavity 104 within which the terminal member 34, header 38, and portions of the electrical leads 90 and 92 are disposed. After insertion of the device 10 into the sleeve 102, the assembly is subjected to a heating step (e.g. heated air or immersion in boiling water) to heat shrink the tube about the unit 10 to assume the configuration shown in FIGS. 11, 12 and 14. The character of the heat shrinkable thermoplastic resin material employed is such that after heat shrinkage the tubular sleeve becomes relatively stiff and rigid and conforms very closely to the external configuration of device 10. After the heat shrinking step, a portion of the pocket 104 is infilled through the open end thereof with a thermally conductive, electrically insulating, thermosetting resin material 196 such as material 96 described above in the FIGS. 3-10 embodiment, to rigidly encapsulate the exposed parts of the device 10 which are to be protected. The heat shrunk tube 102, which conforms closely to the configuration of the unit 10, advantageously serves as a mold to confine and prevent the epoxy of potting material 196 from seeping past the header 38 or flange 14 of the unit 10.

In FIGS. 15 and 16 is shown an assembly generally designated by numeral 200, according to another embodiment of the present invention. The embodiment of FIGS. 15-16 differs from the FIGS. 11-14 embodiment mainly in the provision of an outer tubular sleeve 202 which is formed of an electrically insulating, heat shrinkable thermosetting resin material. A suitable example of this material is Mylar, a trademark of the E. I. duPont de Nemours Co. for a film type polyethylene terephthalate resin material. The tubular sheath or sleeve 202 generally comprises a composite member formed of a plurality of telescoped tubes (only two of which are shown by way of example in the drawings). Each tube is formed by spirally wrapping the film material into a tubular configuration. After heat shrinkage, the sleeve 202 remains generally flexible and while it generally conforms to the configuration of the device 10, it does not conform as closely to the device as does the heat shrinkable thermoplastic resin sleeve 102 of the FIGS. 11-14 embodiment. Sleeve 202, like sleeve 102, provides a pocket 204 in which the terminal member 34, the leads 90 and 92, and the header 38 are disposed after the tube 202 is heat shrunk. Thereafter an epoxy or thermosetting resin material 296 (like material 96 and 196) is introduced into the pocket 204 to infill at least a portion thereof to encapsulate and protect the header 38, terminal 34 and the electrical connections of the header and terminal respectively to the leads 90 and 92, as described above in connection with the embodiments of FIGS. 3-10 and 11-15.

The assemblies 100 and 200 like device 10 can be made in miniaturized form. An advantage of the sleeves 102 and 202 is that the dimensions of the device 10 are not increased by any substantial amount whereby the size of the assembly may be maintained at a minimum and remains suitable for insertion into the small spaces where the assembly is to be employed. Assemblies 100 and 200 are particularly useful for motor protection applications in which, for example, the assembly can be tied to the exterior of a motor winding in the manner illustrated and described in Australian Patent No. 150,-956, published February 23, 1950.

In view of the above, it will be seen that the several objects of the invention are achieved, and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. In combination: a hermetically sealed electrical device including a header member having a glass sealant portion in which is mounted at least one exteriorly extending electrically conductive terminal member; a cap member, open at one end, having side walls and an upper wall; said cap member being provided with an interior cavity; one of said side walls being provided with an exteriorly communicating opening and including a member projecting into said opening providing a pair of spaced notched portions; said cap member being mounted on said electrical device with said open end thereof interfitting with said header member and with said terminal member received and housed within said cavity; a pair of electrically conductive lead members one of which is electrically connected with said terminal member and the other of which is electrically connected with said header member, said lead members extending exteriorly of said cap member through said exteriorly communicating opening in said one of said side walls with each of said leads disposed in a respective one of said notched portions; and said interior cavity being infilled through said exteriorly communicating opening in said one of said side walls with an electrically insulating thermosetting resin material.

2. In combination: a heremetically sealed thermally responsive electrical switch including thermally responsive electrical switching means disposed in a tubular casing sealed at one end by a header member having a glass sealant portion in which is mounted at least one exteriorly extending electrically conductive terminal member; a cap member open at one end having a peripherally extending skirt portion and an upper wall; said upper wall being provided on an exteriorly exposed surface thereof with an elongated groove; said cap member being provided with an interior cavity; said skirt portion being provided with an exteriorly communicating opening therein; said cap member being mounted on said switch casing with said open end thereof interfitting with said header member and with said terminal member received and housed within said cavity; electrically conductive means electrically connected with said terminal member and extending exteriorly of said cap member through said exteriorly communicating opening in said skirt portion; and said interior cavity being infilled through said exteriorly communicating opening in said skirt portion with an electrically insulating thermosetting resin material.

3. In combination: a hermetically sealed thermally responsive electrical switch including thermally responsive electrical switching means disposed in an elongated tubular casing sealed at one end by a header member having a glass sealant portion in which is mounted at least one exteriorly extending electrically conductive terminal member, a cap member open at one end having side walls and an upper wall, said upper wall being provided on an exteriorly exposed surface thereof with an elongated groove; said cap member being provided with an interior cavity, one of said side walls being provided with an exteriorly communicating opening and including a member projecting into said opening providing a pair of spaced notched portions; said cap member being mounted on said switch casing with said open end thereof interfitting with said header member and with said terminal member received and housed within said cavity; a pair of electrically conductive lead members one of which is electrically connected with said terminal member and the other of which is electrically connected with said header member, said lead members extending exteriorly of said cap member through said exteriorly communicating opening in said one of said side walls with each of said leads disposed in a respective one of said notched portions; and said interior cavity being infilled through said exteriorly communicating opening in said one of said side walls with an electrically insulating thermosetting resin material.

4. The combination as set forth in claim 3 and wherein said cap member is formed of electrically insulating material.

5. In combination a motor winding; a thermally responsive electrical switch, including thermally responsive switching means disposed in an elongated tubular casing; said switch including at least one electrically conductive terminal member extending exteriorly from one end of said casing; a portion of said casing including the other end thereof being disposed within an opening provided by said motor winding with said one end of said casing projecting from said winding; a cap member open at one end having a peripherally extending skirt portion and an upper wall; said upper wall being provided on an exteriorly exposed surface thereof with an elongated groove; said cap member being provided with an interior cavity; said skirt portion being provided with an exteriorly communicating opening therein; said cap member being mounted on said switch casing with said open end thereof interfitting with said one end of said casing with said terminal member received and housed within said cavity; electrically conductive means electrically connected with said terminal member and extending exteriorly of said cap member through said exteriorly communicating opening in said skirt portion; and said interior cavity being infilled through said exteriorly communicating opening in said skirt portion with an electrically insulating thermosetting resin material, and tie means disposed in said elongated groove securing said switch to said winding.

6. In combination an article whose temperature is to be sensed; a thermally responsive electrical switch, including thermally responsive switching means disposed in an elongated tubular casing; said switch including at least one electrically conductive terminal member extending exteriorly from one end of said casing; a portion of said casing including the other end thereof being disposed within an opening provided by said article with said one end of said casing projecting from said winding; a cap member open at one end having a peripherally extending skirt portion and an upper wall; said upper wall being provided on an exteriorly exposed surface thereof with an elongated groove; said cap member being provided with an interior cavity; said skirt portion being provided with an exteriorly communicating opening therein; said cap member being mounted on said switch casing with said open end thereof interfitting with said one end of said casing with said terminal member received and housed within said cavity; electrically conductive means electrically connected with said terminal member and extending exteriorly of said cap member through said exteriorly communicating opening in said skirt portion; and said interior cavity being infilled through said exteriorly communicating opening in said skirt portion with an electrically insulating thermosetting resin material, and tie means disposed in said elongated groove securing said switch to said article whose temperature is to be sensed.

7. In combination a motor winding; a hermetically sealed thermally responsive electrical switch including thermally responsive electrical switching means disposed in a tubular casing sealed at one end by a header member having a glass sealant portion in which is mounted at least one electrically conductive terminal member extending exteriorly from one end of said casing; a portion of said casing including the other end thereof being disposed within an opening provided by said motor winding with said one end of said casing projecting from said winding; a cap member open at one end having a peripherally extending skirt portion and an upper wall; said upper wall being provided on an exteriorly exposed surface thereof with an elongated groove; said cap member being provided with an interior cavity; said skirt portion being provided with an exteriorly communicating opening therein; said cap member being mounted on said switch casing with said open end thereof interfitting with said header member and with said terminal member received and housed within said cavity; electrically conductive means electrically connected with said terminal member and extending exteriorly of said cap member through said exteriorly communicating opening in said skirt portion; and said interior cavity being infilled through said exteriorly communicating opening in said skirt portion with an electrically insulating thermosetting resin material and tie means disposed in said elongated groove securing said switch to said winding.

8. The combination as set forth in claim 7 and wherein said cap member is formed of electrically insulating material.

9. In combination: a hermetically sealed electrical switch including electrical switching means disposed in a tubular casing sealed at one end by a header member having an electrically insulating portion in which is mounted at least one exteriorly extending electrically conductive terminal member; an electrically conductive lead electrically connected to said terminal member; an elongated tubular sleeve member formed of electrically insulating heat shrinkable material, said sleeve having at least one open end; said switch, terminal member and lead being disposed within said sleeve member with said header member, terminal member and lead disposed adjacent said open end of said sleeve, said open end of said sleeve extending beyond said header and terminal member forming a pocket within which said terminal member and lead are disposed, at least a portion of said pocket being infilled through said open end of said sleeve with an electrically insulating resin material, said resin material surrounding said terminal and a portion of said lead to provide a protective encapsulation for said terminal, lead and header whereby forces acting on said switch externally of said sleeve member are distributed to said casing thereby minimizing forces acting on said terminal, lead and header, and said lead having a portion extending exteriorly of said sleeve through the open end thereof.

10. The combination as set forth in claim 9 and wherein said sleeve comprises a plurality of wrapped layers of a film of polyethylene terephthalate resin and said sleeve being heat shrunk about said casing and generally conforming to the external configuraion of said casing.

11. In combination: a sealed thermally responsive electrical switch including thermally responsive electrical switching means disposed in a tubular casing sealed at one end by a header member having an electrically insulated portion in which is mounted at least one exteriorly extending electrically conductive terminal member; a cap member, open at one end, having side walls and an upper wall, said cap member being provided with an interior cavity, one of said side walls being provided with an exteriorly communicating opening and including a member projecting into said opening providing a pair of spaced notched portions; said cap member being mounted on said switch casing with said open end thereof interfitting with said header member and with said terminal member received and housed within said cavity; a pair of electrically conductive lead members having portions disposed within said cavity and electrically connected with said switch and also having portions extending exteriorly of said cap member through said exteriorly communicating opening in said one of said side walls with each of said leads disposed in a respective one of said notched portions; and said interior cavity being infilled through said exteriorly communicating opening in said one of said side walls with an electrically insulating resin material.

12. In combination: a sealed electrical switch including electrical switching means disposed in a tubular casing sealed at one end by a header member having an electrically insulating portion in which is mounted at least one exteriorly extending electrically conductive terminal member; a cap member open at one end and having a peripherally extending skirt portion and an upper wall, said cap member being provided with an interior cavity, said skirt portion being provided with an exteriorly communicating opening therein communicating with said cavity, said cap member being mounted on said switch casing with the open end thereof interfitting with said header member and with said terminal member received and housed within said cavity; a pair of spaced electrically conductive lead members having portions disposed within said cavity and electrically connected with said switch and also having portions extending exteriorly of said cap member through said exteriorly communicating opening in said skirt portion; and said interior cavity being infilled through said exteriorly communicating opening in said skirt portion with an electrically insulating resin material, said resin material surrounding said terminal and electrically conductive leads to provide a protective encapsulation for said terminal and leads.

13. The combination as set forth in claim 9 and wherein said electrically insulating portion of said header member is a glass sealant.

References Cited by the Examiner

UNITED STATES PATENTS

| | | | |
|---|---|---|---|
| 2,295,295 | 9/42 | Schimkus | 200—113.2 |
| 2,745,924 | 5/56 | Coates | 200—138 |
| 2,752,463 | 6/56 | Staak | 200—168 |
| 2,785,251 | 3/57 | Cassidy | 200—168 |
| 2,820,870 | 1/58 | Moksu | 200—138 |
| 2,842,644 | 7/58 | Korsgren | 200—168 |
| 2,977,456 | 3/61 | Stiebel | 200—168 |
| 3,031,565 | 4/62 | Appleton et al. | 200—138 |
| 3,104,296 | 9/63 | Moksu et al. | 200—113 |

OTHER REFERENCES

DeBacker, RCA Technical Notes #75, November 1957 published by Radio Corp. of America, RCA Laboratories, Princeton, New Jersey. (Terminal Bases for Vacuum Tubes.)

BERNARD A. GILHEANY, *Primary Examiner.*